(12) United States Patent
Drake et al.

(10) Patent No.: US 10,901,068 B2
(45) Date of Patent: Jan. 26, 2021

(54) MANHOLE COVER ROADWAY RADAR SAFETY DEVICE

(71) Applicant: Smartcover Systems, Escondido, CA (US)

(72) Inventors: David Drake, Escondido, CA (US); Gregory M. Quist, Escondido, CA (US)

(73) Assignee: SMARTCOVER SYSTEMS, Escondido, CA (US)

( * ) Notice: Subject to any disclaimer, the term of this patent is extended or adjusted under 35 U.S.C. 154(b) by 182 days.

(21) Appl. No.: 16/103,119

(22) Filed: Aug. 14, 2018

(65) Prior Publication Data

US 2019/0049553 A1 Feb. 14, 2019

Related U.S. Application Data

(60) Provisional application No. 62/545,436, filed on Aug. 14, 2017.

(51) Int. Cl.
*G01S 7/02* (2006.01)
*G01S 7/40* (2006.01)
(Continued)

(52) U.S. Cl.
CPC ............ *G01S 7/023* (2013.01); *G01S 7/003* (2013.01); *G01S 7/40* (2013.01); *G01S 7/4026* (2013.01);
(Continued)

(58) Field of Classification Search
CPC . G01S 7/023; G01S 7/003; G01S 7/40; G01S 7/4026; G01S 13/931; G01S 2007/027; E02D 29/12
(Continued)

(56) References Cited

U.S. PATENT DOCUMENTS 4,646,560 A * 3/1987 Maresca, Jr. ....... G01M 3/3245
73/299
5,122,801 A * 6/1992 Hughes ................... G01S 7/021
342/13
(Continued)

FOREIGN PATENT DOCUMENTS

EP 0501367 A1 * 9/1992 ......... E02D 29/1409
EP 1612757 A2 * 1/2006 ....... G08G 1/096783
(Continued)

*Primary Examiner* — Vladimir Magloire
*Assistant Examiner* — Nuzhat Pervin
(74) *Attorney, Agent, or Firm* — Jonathan Kidney; Intelink Law Group, P.C.

(57) ABSTRACT

A method and device for controlling EM radiation from an exposed manhole around roadways. A remote field unit controller is disposed under a manhole cover proximal to a roadway, with a sensor attached to either the manhole cover, a manhole, or the remote field unit controller, providing information of at least one of a position, acceleration, direction of the manhole cover. An EM transmitter/receiver and EM emitter/absorber are disposed under the manhole cover and an EM controller communicates to the EM transmitter. When the sensor detects sufficient movement of the manhole cover, a signals is sent to the remote field unit controller to at least one of suppress, alter, and turn off EM emissions from the EM transmitter so as to prevent EM radiation from entering the roadway.

20 Claims, 2 Drawing Sheets

(51) Int. Cl.
  *G01S 7/00* (2006.01)
  *G01S 13/931* (2020.01)
  *E02D 29/12* (2006.01)

(52) U.S. Cl.
  CPC ............ *G01S 13/931* (2013.01); *E02D 29/12* (2013.01); *G01S 2007/027* (2013.01)

(58) Field of Classification Search
  USPC ........................................................ 342/173
  See application file for complete search history.

(56) References Cited

U.S. PATENT DOCUMENTS

| | | | | |
|---|---|---|---|---|
| 7,221,282 B1* | 5/2007 | Ross | ................... | G08B 21/182 340/603 |
| 9,612,357 B1* | 4/2017 | Tzuang | ................. | G01V 8/005 |
| 10,634,540 B2* | 4/2020 | Forster-Knight | ........ | H04Q 9/00 |
| 2002/0190068 A1* | 12/2002 | Sisk | ....................... | B65D 90/10 220/263 |
| 2003/0005759 A1* | 1/2003 | Breed | .............. | G08G 1/096758 73/146 |
| 2003/0080836 A1* | 5/2003 | Nagaishi | ................ | H01P 1/047 333/247 |
| 2004/0003951 A1* | 1/2004 | Kikuchi | ................ | G01S 7/4052 180/169 |
| 2004/0084359 A1* | 5/2004 | Pasko | ................... | G01F 23/268 210/97 |
| 2005/0152700 A1* | 7/2005 | Fling | .................... | H04B 10/071 398/135 |
| 2005/0278098 A1* | 12/2005 | Breed | ................... | G01S 13/931 701/45 |
| 2006/0261941 A1* | 11/2006 | Drake | ................... | G01F 15/063 340/539.26 |
| 2006/0283252 A1* | 12/2006 | Liu | ....................... | G01S 13/755 73/649 |
| 2007/0182528 A1* | 8/2007 | Breed | ................... | B60Q 9/008 340/435 |
| 2008/0040004 A1* | 2/2008 | Breed | ................. | B60R 21/0134 701/45 |
| 2008/0046150 A1* | 2/2008 | Breed | ................. | B60R 21/0134 701/45 |
| 2008/0098662 A1* | 5/2008 | Laffitte Figueras | ........................ | E02D 29/1427 52/20 |
| 2008/0119966 A1* | 5/2008 | Breed | .............. | G08G 1/096758 701/2 |
| 2008/0167819 A1* | 7/2008 | Breed | .................... | G08G 1/161 701/300 |
| 2009/0201123 A1* | 8/2009 | Kafry | ..................... | G05B 15/02 340/3.32 |
| 2011/0148631 A1* | 6/2011 | Lanham | ................. | G08B 13/06 340/540 |
| 2012/0206270 A1* | 8/2012 | Lee | .......................... | H04Q 9/00 340/870.02 |
| 2013/0212945 A1* | 8/2013 | Lanham | ................. | E05F 15/60 49/25 |
| 2014/0300507 A1* | 10/2014 | Ohnishi | .................... | G01S 7/28 342/173 |
| 2015/0226838 A1* | 8/2015 | Hayakawa | .............. | G01P 15/00 342/70 |
| 2016/0043465 A1* | 2/2016 | McDevitt | ................ | G01S 13/74 342/368 |
| 2016/0357187 A1* | 12/2016 | Ansari | ..................... | G01S 13/862 |
| 2016/0357188 A1* | 12/2016 | Ansari | ............... | G06K 9/00805 |
| 2016/0357262 A1* | 12/2016 | Ansari | ............... | G06Q 10/0833 |
| 2016/0358477 A1* | 12/2016 | Ansari | ............... | G06Q 30/0251 |
| 2017/0222115 A1* | 8/2017 | Kurihara | .................. | H04Q 9/00 |
| 2017/0227391 A1* | 8/2017 | Forster-Knight | ....... | E02D 29/12 |
| 2017/0284689 A1* | 10/2017 | Steele | ..................... | E02D 29/12 |
| 2018/0131449 A1* | 5/2018 | Kare | ....................... | G01S 17/04 |
| 2019/0041497 A1* | 2/2019 | Smith | ..................... | G01S 13/86 |

FOREIGN PATENT DOCUMENTS

| | | | | |
|---|---|---|---|---|
| GB | 2427058 A | * | 12/2006 | ............ G08G 1/164 |
| GB | 2502722 A | * | 12/2013 | ............ G06Q 10/06 |

* cited by examiner

MANHOLE COVER ROADWAY RADAR SAFETY DEVICE

CROSS-REFERENCE TO RELATED APPLICATION(S)

This application claims the benefit of U.S. Provisional Patent Application No. 62/545,436, filed Aug. 14, 2017, the contents of which is hereby incorporated by reference in its entirety.

FIELD

This invention is directed to systems and methods for reducing interference between roadway guidance and travel sensors/systems within automobiles and the environmental sensors/systems located in or about the roadway itself.

BACKGROUND

The worldwide automotive industry has adopted several technologies to support improved driving safety, including warning annunciators, proximity detectors, pedestrian detectors, automatic braking systems, lane excursion detectors, and collision avoidance systems. In their most sophisticated versions, automotive systems will take over all active driving for the vehicle. Many of these systems use remote sensing, imaging, laser and radar systems to sense the locations of potential risks. These same types of detection systems are also deployed for environmental management and monitoring on or near roadways. Therefore, these systems have the potential for interference with real time automotive systems. The effects of such interference are undetermined, but raise the risk of injury and liability. This disclosure proposes to the reduce the risk of such interference.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the disclosed embodiments, a device for controlling EM radiation from an exposed manhole around roadways is provided, comprising: a remote field unit controller disposed under a manhole cover proximal to a roadway; a sensor attached to either the manhole cover, a manhole, or the remote field unit controller, providing information of at least one of a position, acceleration, direction of the manhole cover; an EM transmitter and EM emitter, disposed under the manhole cover; and an EM controller communicating to the EM transmitter, the EM controller receiving information from the remote field unit controller, wherein when the sensor detects a threshold movement of the manhole cover, it sends a triggering signal to the remote field unit controller to at least one of suppress, alter, and turn off EM emissions from the EM transmitter so as to prevent EM radiation from entering the roadway.

In another aspect of the disclosed embodiments, the device described above is provided, further comprising an EM absorber and an EM receiver, the EM receiver communicating to the EM controller; and/or further comprising a processing computer communicating with the EM controller; and/or wherein the EM emitter and EM absorber are a single system; and/or wherein the EM transmitter and EM receiver are a single system; and/or wherein the EM controller and processing computer are a single system; and/or the sensor contains an accelerometer; and/or the sensor is a mechanical displacement sensor; and/or wherein the sensor is an optically triggered sensor; and/or wherein altering the EM emissions comprises at least one of switching a frequency of the EM emissions; and/or wherein the triggering signal is sent to the EM controller to at least one of suppress, alter, and turn off EM emissions from the EM transmitter.

In yet another aspect of the disclosed embodiments, a method for controlling EM radiation from an exposed manhole around roadways is provided, comprising: disposing a remote field unit controller under a manhole cover proximal to a roadway; attaching a sensor to either the manhole cover, a manhole, or the remote field unit controller, wherein the sensor provides information of at least one of a position, acceleration, direction of the manhole cover; disposing an EM transmitter and EM emitter under the manhole cover; communicating from an EM controller to the EM transmitter, the EM controller receiving information from the remote field unit controller; and at least one of suppressing, altering, and turning off EM emissions from the EM transmitter so as to prevent EM radiation from entering the roadway when the sensor detects a threshold movement of the manhole cover.

In yet another aspect of the disclosed embodiments, the above method is provided wherein a data of the threshold movement is sent to remote field unit controller to effect the at least one suppressing, altering, and turning off the EM emissions; and/or a data of the threshold movement is sent to the EM controller to effect the at least one suppressing, altering, and turning off the EM emissions; and/or, wherein at least EM transmitter, EM emitter, and EM controller are a single system; and/or wherein the sensor is an accelerometer; and/or wherein the sensor is a mechanical displacement sensor; and/or wherein the sensor is an optically triggered sensor; and/or wherein altering the EM emissions comprises at least one of switching a frequency of the EM emissions; and/or further comprising sending the triggering signal to the EM controller to at least one of suppress, alter, and turn off EM emissions from the EM transmitter.

DETAILED DESCRIPTION

Figure 1:
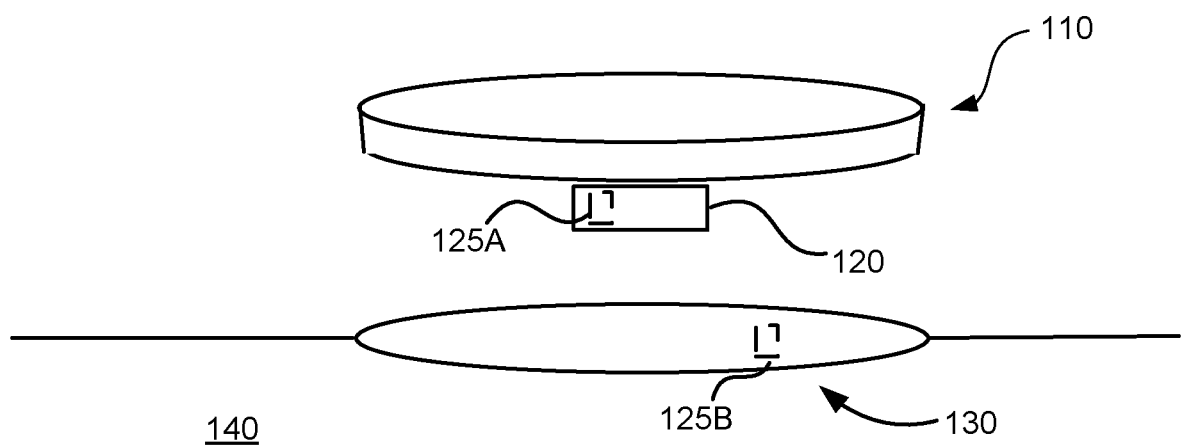
FIG. 1 is an illustration of an exemplary a manhole installation configuration.

Licensing for automotive radio and light detection and ranging (lidar) emission varies from country to country. (In this disclosure, radar and lidar are considered technically equivalent). For example, in the United States, the 76-80 GHz band is licensed for use on automotive radars, but other uses, that don't interfere, are allowed. In South Korea, this band is for exclusive automotive use. In Japan, there is widespread shared use of radar allocations. Automotive Radar frequency bands include 24 GHz, 76-81 GHz, 60 GHz, and others. Other countries have various frequency allocations, approximations of which as shown below

TABLE 1

| Organization | Automotive radar Frequency Bands |
| --- | --- |
| CEPT (Europe) | 76-77 GHZ |
| ETSI (Europe) | 76-77 GHZ |
| FCC (USA) | 46.7-46.9 GHz, 76-77 GHz |
| ITU | 60-61 GHz, 76-77 GHz |
| MPT (Japan) | 60-61 GHz, 76-77 GHz |

Roadways, easements, frontage roads, utilities, pedestrian pathways, drainage systems, water supplies, electrical systems, traffic signals, traffic monitoring, sewer systems, infrastructure, and air quality measurement systems are all candidates for the application of radar systems. The concern is that the infrastructure measurements could conflict with the real time automotive systems. The conflict could include direct signal interference with measurements, receiver desensitization, timing interference, receiver damage, or signal confusion.

For example, the following is an excerpt from FCC Document 15-16 concerning licensing for vehicular radar in the United States:

Notice of Proposed Rulemaking and Reconsideration Order

Adopted: Feb. 3, 2015 Released: Feb. 5, 2015
Comment Date: (30 days after date of publication in the Federal Register)
Reply Comment Date: (45 days after date of publication in the Federal Register)
Site: https://www.fcc.gov/document/operation-radar-services-76-81-ghz-band 1. With this Notice of Proposed Rulemaking and Reconsideration Order (Notice), we propose to authorize radar applications in the 76-81 GHz band. We seek to develop a flexible and streamlined regulatory framework that will encourage efficient, innovative uses of the spectrum and to allow various services to operate on an interference-protected basis. In doing so, we further seek to adopt service rules that will allow for the deployment of the various radar applications in this band, both within and outside the U.S. We take this action in response to a petition for rulemaking filed by Robert Bosch, LLC (Bosch)1 and two petitions for reconsideration of our 2012 Vehicular Radar R&O.

B. Section Concerned with Fixed Radar Applications

14. Subsequently, as part of the Vehicular Radar NPRM discussed above, the Commission examined the use of fixed radar systems in the 76-77 GHz band and proposed to allow such use at any location, rather than restrict their use to only airport locations per the Era petition for rulemaking. 25 The Commission stated that limiting fixed radar operations to specific locations such as airports might be overly restrictive and could unnecessarily burden the public. In the subsequent Vehicular Radar R&O, the Commission permitted unlicensed operation of fixed radars, including FOD detection radars, in the 76-77 GHz band at airport locations. It permitted such operation on an unlicensed basis under the same Part 15 rules and with the same emission limits that it applied to vehicular radars in the band. 26

C. Section Concerned with Level Sensing

23. Level Probing Radar. An additional permitted operation in the 77-81 GHz band is that of level probing radars (LPRs) which operate on an unlicensed basis under Part 15.46 LPRs are used to measure the amount of various materials contained in storage tanks or vessels or to measure water or other material levels in outdoor locations. They are typically mounted inside storage tanks or on bridges or on other elevated structures in outdoor locations, and emit radio frequency (RF) signals through an antenna aimed downwards to the surface of the substance to be measured. 47 The Commission recently concluded that LPR devices would be able to co-exist successfully with vehicular radars. 48 It based its conclusion on the nature of LPR equipment, which is installed in a downward-looking position at fixed locations, and because the main-beam emission limits have been carefully calculated to avoid harmful interference to other radio services.

The above excerpts describe the sharing of radar spectrum between mobile automotive radar and fixed site radar, including level probing radars. The FCC suggests that these applications are allowed, but does not guarantee mutual function. The present application addresses at least one potential source of radar interference that could cause safety problems. That is, if a level sensing system were placed in a manhole and the manhole was opened, it is possible that radar signals could be transmitted directly into areas of high traffic. This may or may not cause problems with real time automotive control systems. No one can predict exactly what will occur, if this happens. As detailed below, various systems and methods are presented that employ measurement and/or detection of the position of the manhole or cover, to mute or adjust the manhole's radar in the event of tampering or service events.

FIG. 1 is an illustration 100 of an exemplary a manhole installation configuration. The manhole cover 110 can be removed from the Manhole Ring 120 130 and tipped or lifted out from within a roadway or near roadway surface 140. If it is tipped on its side or on its back, the data acquisition system 120 (typically on an underside or below the manhole cover 110) has the possibility of emitting radar or other signals into the environment. Even slight angling, in some cases, off the Manhole Ring 120 130 can give rise to electromagnetic (EM) energy from the data acquisition system 120 to be emitted from outside the confines of the Manhole Ring 120 130. It is presumed here that the data acquisition system 120 contains an EM radiating source 125A (shown here for illustration purposes as coupled to the data acquisition system 120), or such a source 125A is "below" the manhole cover 110. In some instances, the EM generating source 125B may attached to the wall(s) of the manhole. In either case, opening the manhole cover 110 can release EM fields into the environment.

As stated above, this disclosure will refer to radar in the generic sense of the term. That is, for ease of explanation, lidar systems. EM radiating systems, and the like will be understood to fall under the umbrella term "radar."

Figure 2:
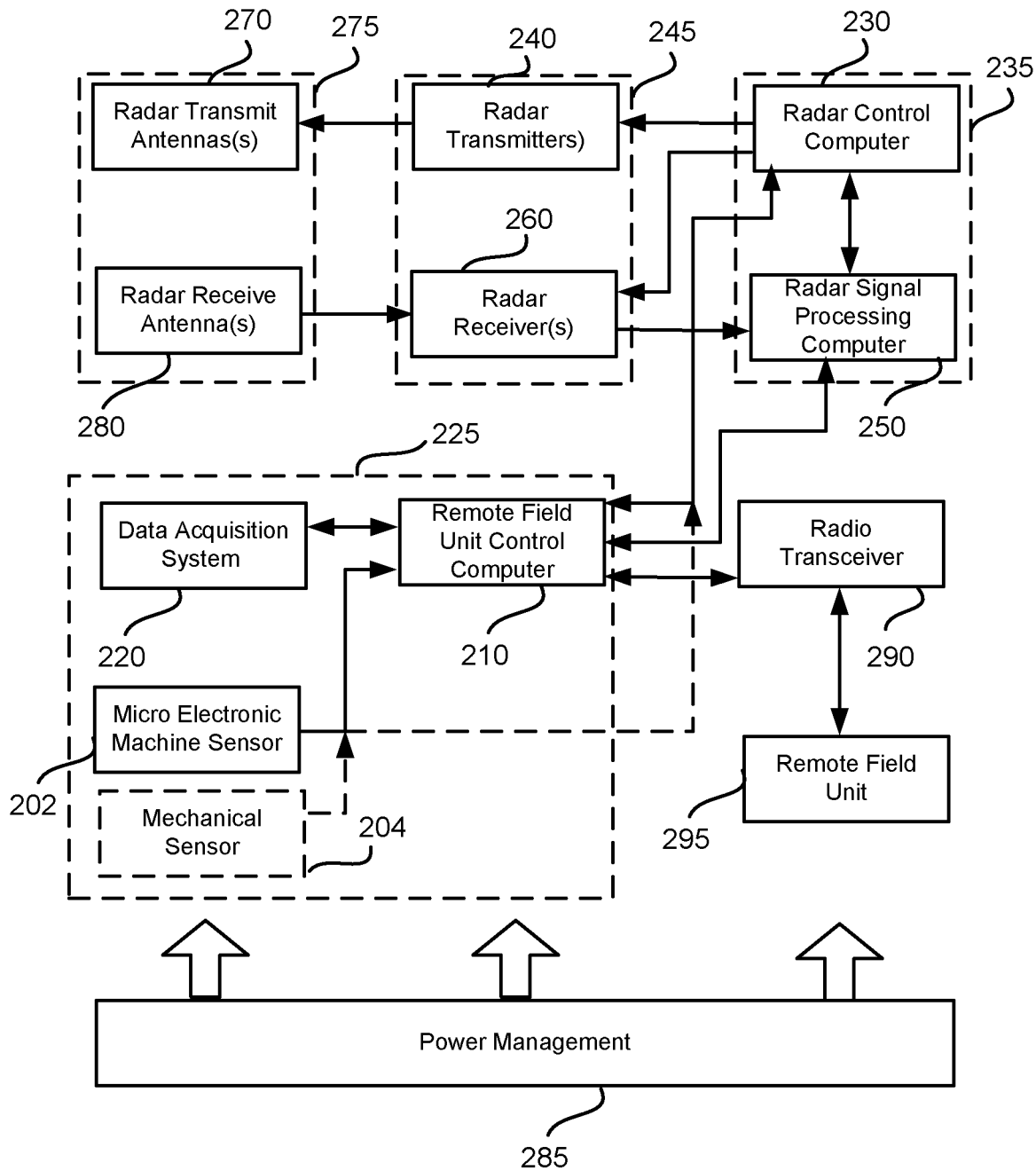
FIG. 2 is an overview diagram of an exemplary system of a data acquisition system with EM radiation (e.g., radar) management, sensitive to manhole cover disturbance.

FIG. 2 is an overview diagram 200 of an exemplary system of a data acquisition system with EM radiation (radar) management, sensitive to manhole cover disturbance. In this example, a Remote Field Unit (RFU) Control Computer (CC) 210 coordinates the operation of the entire system. However, in other embodiments, operational control may be distributed to other devices, components, according to design preference. RFU CC 210 receives information from a Data Acquisition System (DAS) 220 such as pressure, temperature, or other measurements known in the art. It is understood that DAS 220 is part of the assemblage situated below or under the manhole cover. And that the EM radiating system (as evident below) is located within the manhole, either attached to the DAS 220, attached to the manhole cover, or located within the manhole confine.

DAS 220 also communicates with a Radar Control Computer (RCC) 230, which may or may not the exclusive radar controller (depending on implementation preference). RCC 230 is operated to directly manage the transmission and reception of radar signals. It sends commands and receives status updates from Radar Transmitters 240 and similarly with the Radar Signal Processing Computer (RSPC) 250. RSPC 250 receives status and signals from Radar Receiver(s) 260. The Radar Transmitters and Receivers can have a plurality of respective antennas 270, 280 for radiation, such as for beam forming and beam steering, etc. (It is understood in the art that hardware to generate the EM energy to be transmitted can be generically called an EM transmitter conversely, hardware to receiving EM energy can be generically called an EM receiver. However, in the art, systems with both EM transmitters and EM emitters (transmitter+antenna) can be purposed as a single unit, as well as dual purpose transmit and receive systems (e.g., EM transmitter/receiver—called a transceiver—with EM antennas). It should be understood that antennas generally are dual function devices, enabling both the emission (wireless transmission or emitting) of EM energy and also their absorption/reception (wireless absorption or receiving).

The RSPC 250 performs analytical functions such as determining the range of targets, determining the Doppler shift of signals to extract the speed of moving water, and adjusting beam direction for remote scanning, 3-D mapping of the target area, and so forth. These parameters are delivered to the RFU CC 210 for commutation and transmission back to a communications Radio Transceiver 290 and then to a wireless network (not shown). These parameters or functions (presented here) are only a possible list of parameters/functions of the RSPC 250, noting that more or less parameters/functions may be facilitated. Therefore, in some embodiments the RSPC 250 may only perform a single desired function, or in other embodiments perform multiple functions.

It should be noted here that the various components described above may be combined into lesser or distributed into more components depending on design preference. For example, transmit and receive antennas 270, 280 may be a single antenna 275 having dual capabilities. The radar transmitter(s) and receiver(s) 240, 260 may be a single device 245 having both transmit and receive capabilities. Similarly, Radar Control Computer and Radar Signal Processing Computer 230, 250 may be a single computer or controller 235 having both capabilities. Also, in some embodiments, the entire EM radiating system may be a single device, that is elements 230, 240, 250, 260, 270, 280 may be a single component, for example, a hybrid RF circuit.

Following with this theme, in some embodiments, the various devices, systems described above may be composed of several separate components with or without additional features. As one non-limiting examples, Radar Control Computer 230 may have switches (not shown), memory, tuning, etc. that are separate from what is shown.

Returning to FIG. 2, Power Management System (PMS) 285 is controlled by the RFU CC 210, providing power to various sub-systems for their operations. Typically, PMS 285 converts battery or renewable power to a voltage used by the respective internal electronic systems.

The RFU CC 210 can command some of the sub-systems in its Field Unit or PMS 285, for example, to have their power turned off. Also, it may provide control of other Remote Field Unit(s) 295. Dashed system 225 represents a given Field Unit having respective components Data Acquisition System 220, RFU CC 210, Micro Electronic Machine (MEM) Sensor 202, and optional Mechanical Sensor 204. It is presumed here that one or more of the respective components of system 225 are attached to a manhole cover so as to provide real time measurement or detection of position or motion of a local manhole cover (not shown). For example, if the Data Acquisition System 220 is "moved," the associated MEM Sensor 202 and/or 204 will detect the local displacement/movement of the manhole cover and report to the RFU CC 210.

If using an Accelerometer-based MEMS Sensor 202, either coupled to the RFC CC 210 or attached separately to the manhole cover in its normal position (e.g., mounted in the Manhole Ring)—then if the manhole cover is moved, the MEM Sensor 202 will detect a change of the local gravitational field and return that result to the RFU CC 210. Once movement is detected, RFU CC 210 can send a command to the Radar Control Computer 230 to not transmit Radar signals, or reduce the power of the signals, or even switch frequencies or type of signal being sent (e.g., from RF to infrared or lidar).

In some embodiments, the triggering signal can be forwarded directly to the Radar Control Computer 230, bypassing the RFU CC 210, if so desired.

In some embodiments, a degree or threshold of movement may be necessary to trigger a signal, that is, traffic vibrations may cause movement of the manhole cover but be insufficient to "lift" the manhole cover off the manhole. Similarly, rotating a manhole cover may or may not cause a triggering event. (It is noted here that mechanical sensors 204, while being suitable for detecting when the manhole cover is "lifted," they may falsely indicate lifting when the cover is rotated.) Accordingly, various other types of sensors may be used, depending on the desired triggering sensitivity. Further, while only two types of sensors are described, it is possible that other types of sensor(s) that provide the desired movement indication may be utilized. For example, a pressure sensor could be used to detect the weight of the manhole cover on the manhole, or an optical trigger.

Therefore, it is understood that various degrees of movement and/or sensors may be used for determining if the manhole cover is sufficiently elevated above the manhole to permit radar escapage. Additionally, the "type, frequency, duration, etc." of movement can be evaluated to determine whether displacement is from a source that can be ignored or if from a source that ultimately will cause radar leakage into the environment. For example, it is known that when a manhole cover is lifted by an unauthorized person without proper tools, they will have difficulty lifting the cover (raising it slightly up and down several times). Detection of such a series of events may constitute a triggering event for the RFU CC 210. Other possible triggering events are within in the purview of one of ordinary skill in the art and understood to be within the scope of this disclosure.

If a triggering movement or event is detected, the RFU CC 210 can send a message to the PMS 285 to remove power from the Radar Transmitter(s) 240 preventing any Radar signal from being transmitted. Additionally, rather than turn the transmitter "off," a non-signal state could be sent to the RRC 230 to have it suppress a signal to the Radar Transmitter(s) 240. Alternatively, as stated above, a different amplitude, frequency, type of signal structure or waveform, type of radar, signal strength, etc. could be implemented to reduce the effect of RF leakage into the roadway environment. Any one or more of the above actions may be utilized, if so desired.

The present disclosure is not to be limited in terms of the particular embodiments described in this application, which are intended as illustrations of various aspects. Many modifications and variations can be made without departing from its scope, as will be apparent to those skilled in the art.

Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, implementations, and realizations, which can, of course, vary. It is also to be understood that the terminology used herein is for the purpose of describing particular embodiments only, and is not intended to be limiting.

What is claimed is:

1. A device for controlling EM radiation from an exposed manhole from entering around roadways, comprising:
    a remote field unit controller disposed under a manhole cover proximal to a roadway, configured with an ability to at least one of suppress, alter, and turn off EM emissions from the EM transmitter;
    a sensor attached to either the manhole cover, a manhole, or the remote field unit controller, providing information of at least one of a position, acceleration, direction of the manhole cover, the sensor configured to detect a threshold movement of the manhole cover, and upon detection sending a triggering signal to the remote field unit controller;
    an EM transmitter and EM emitter, transmit antenna disposed under the manhole cover; and
    an EM controller communicating to the EM transmitter, the EM controller receiving information from the remote field unit controller,
    wherein when the sensor detects a threshold movement of the manhole cover, it sends a triggering signal is received by to the remote field unit controller, the remote field unit controller to at least one of suppresses, alters, and turns off EM emissions from the EM transmitter so as to prevent EM radiation from entering the roadway.

2. The device of claim 1, further comprising an EM absorber a receive antenna and an EM receiver, the EM receiver communicating to the EM controller.

3. The device of claim 1, further comprising a processing computer communicating with the EM controller.

4. The device of claim 1, wherein the EM emitter and EM absorber transmit antenna and receive antenna are a single system.

5. The device of claim 1, wherein the EM transmitter and EM receiver are a single system.

6. The device of claim 1, wherein the EM controller and processing computer are a single system.

7. The device of claim 1, wherein the sensor contains an accelerometer.

8. The device of claim 1, wherein the sensor is a mechanical displacement sensor.

9. The device of claim 1, wherein the sensor is an optically triggered sensor.

10. The device of claim 1, wherein altering the EM emissions comprises at least one of switching a frequency of the EM emissions.

11. The device of claim 1, wherein the triggering signal is sent to the EM controller to at least one of suppress, alter, and turn off EM emissions from the EM transmitter.

12. A method for controlling EM radiation from an exposed manhole from entering around roadways, comprising:
    disposing a remote field unit controller under a manhole cover proximal to a roadway;
    attaching a sensor to either the manhole cover, a manhole, or the remote field unit controller, wherein the sensor provides information of at least one of a position, acceleration, direction of the manhole cover;
    disposing an EM transmitter and EM emitter transmit antenna under the manhole cover;
    communicating from an EM controller to the EM transmitter, the EM controller receiving information from the remote field unit controller; and
    at least one of suppressing, altering, and turning off EM emissions from the EM transmitter so as to prevent EM radiation from entering the roadway when the sensor detects a threshold movement of the manhole cover.

13. The method of claim 12, wherein a data of the threshold movement is sent to remote field unit controller to effect the at least one suppressing, altering, and turning off the EM emissions.

14. The method of claim 12, a data of the threshold movement is sent to the EM controller to effect the at least one suppressing, altering, and turning off the EM emissions.

15. The method of claim 12, wherein at least EM transmitter, EM emitter antenna, and EM controller are a single system.

16. The method of claim 12, wherein the sensor is an accelerometer.

17. The method of claim 12, wherein the sensor is a mechanical displacement sensor.

18. The method of claim 12, wherein the sensor is an optically triggered sensor.

19. The method of claim 12, wherein altering the EM emissions comprises at least one of switching a frequency of the EM emissions.

20. The method of claim 12, further comprising sending the triggering signal to the EM controller to at least one of suppress, alter, and turn off EM emissions from the EM transmitter.

* * * * *